Figure 1:
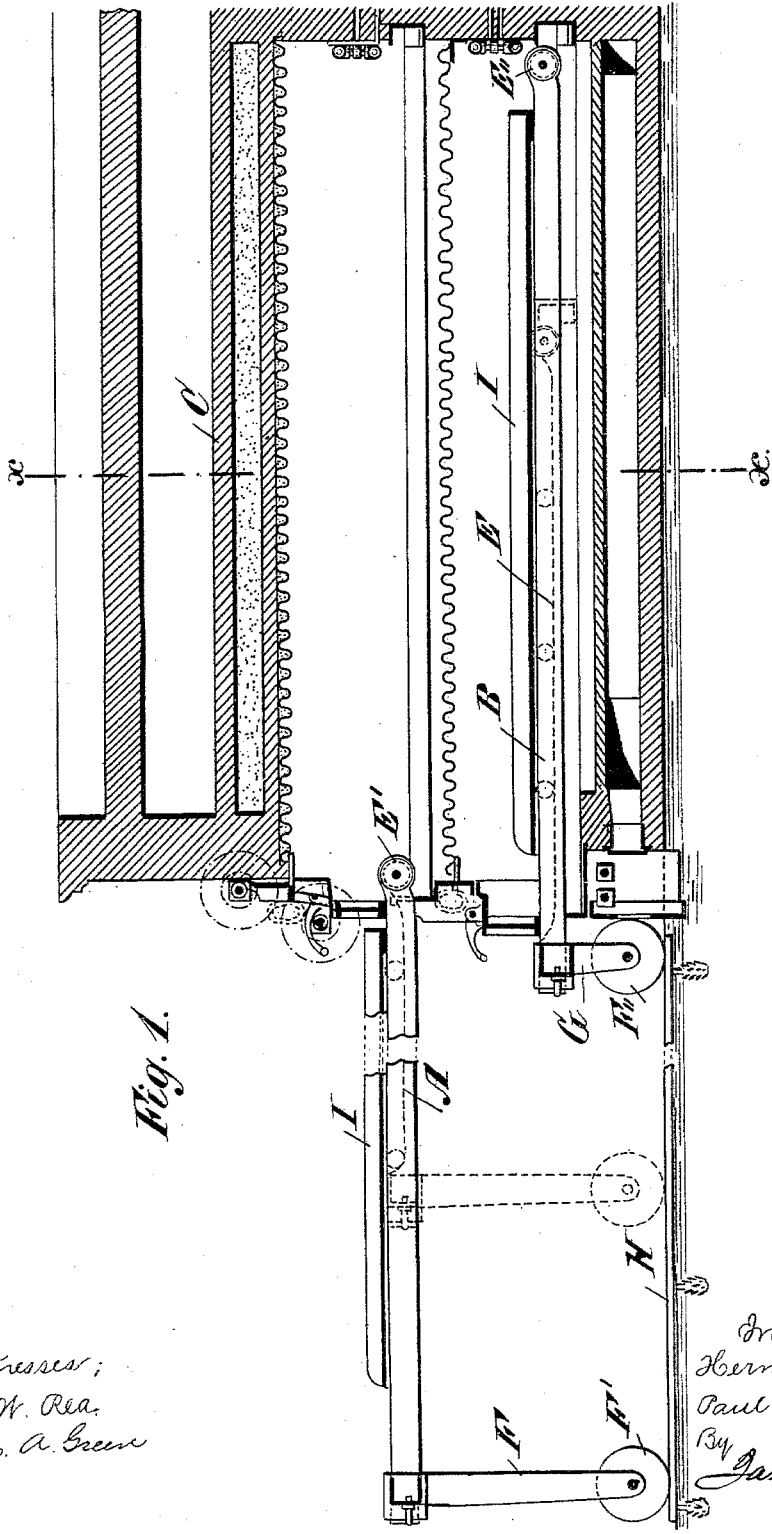

(No Model.) 3 Sheets—Sheet 1.

H. WERNER & P. PFLEIDERER.
BAKING OVEN.

No. 566,639. Patented Aug. 25, 1896.

Witnesses:
G. W. Rea.
Thos. A. Green

Inventors:
Hermann Werner,
and
Paul Pfleiderer,
By
James L. Norris
Atty (No Model.) 3 Sheets—Sheet 2.
H. WERNER & P. PFLEIDERER.
BAKING OVEN.
No. 566,639. Patented Aug. 25, 1896.
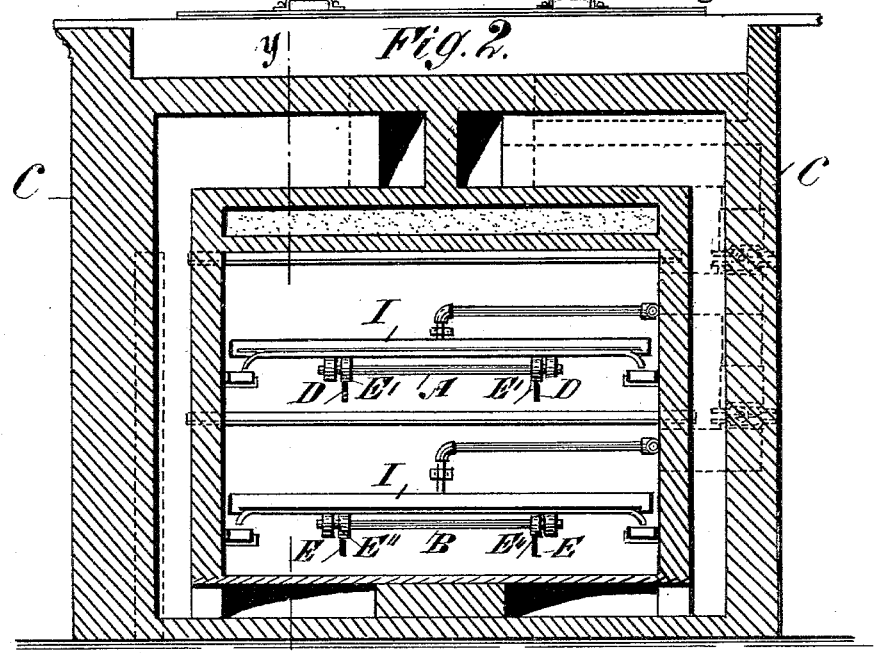
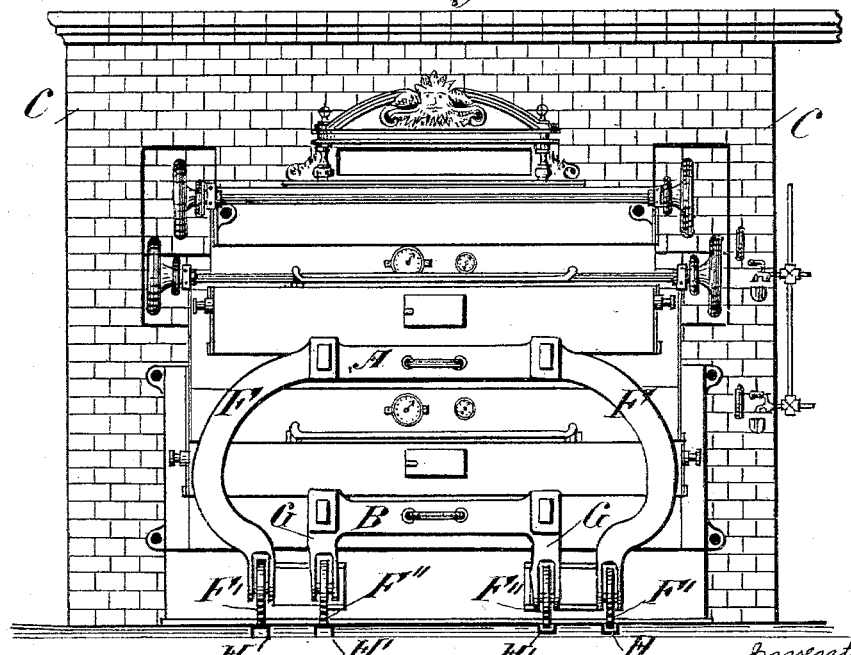

(No Model.) 3 Sheets—Sheet 3.
H. WERNER & P. PFLEIDERER.
BAKING OVEN.

No. 566,639. Patented Aug. 25, 1896.

Witnesses:
G. W. Rea
Thos. A. Green

Inventors:
Hermann Werner
and
Paul Pfleiderer
By James L. Norris
Atty

UNITED STATES PATENT OFFICE.

HERMANN WERNER, OF CANNSTADT, GERMANY, AND PAUL PFLEIDERER, OF LONDON, ENGLAND, ASSIGNORS TO THE CANNSTATTER MISCH AND KNETMASCHINEN-FABRIK WERNER & PFLEIDERER, OF CANNSTADT, GERMANY.

BAKING-OVEN.

SPECIFICATION forming part of Letters Patent No. 566,639, dated August 25, 1896.

Application filed March 5, 1894. Serial No. 502,402. (No model.) Patented in France August 23, 1893, No. 232,366.

*To all whom it may concern:*

Be it known that we, HERMANN WERNER, of Cannstadt, near Stuttgart, in the Kingdom of Würtemberg and German Empire, and PAUL PFLEIDERER, of London, in the county of Middlesex and Kingdom of Great Britain, have invented a certain new and useful Improvement in Baking-Ovens, (for which we have obtained a patent in France, No. 232,366, bearing date August 23, 1893,) of which the following is a specification, reference being had to the accompanying drawings.

Our invention relates to baking-ovens, the object being to provide improved means to be used in connection with baking-ovens for facilitating the temporary removal of the baking-plates from and the reinsertion of the same into the oven and for holding the baking-plates supported in front of the oven in such a manner as to render them easily accessible in their full length when it is desired to place the dough loaves thereon or to remove the baked loaves therefrom or to temporarily inspect the loaves during the process of baking.

Another object of our said invention is to better utilize the space in front of the oven than has been possible heretofore, more particularly in such cases where the space in the bakehouse is limited.

In a great many of the baking-ovens as heretofore generally employed, a fixed frame is mounted directly in front of the baking-oven, and the baking-plates are drawn out from the mouth of the baking-oven onto such frame and held supported thereon until the dough loaves have been placed upon the said baking-plates, the latter being then pushed into the oven. When it is desired to remove the ready-baked loaves from the baking-plates or to temporarily inspect the loaves during the process of baking, the said plates are again drawn out of the oven and onto the said frame. One objection very often raised against these fixed frames is this, that they occupy a large amount of space in the bakehouse in front of the oven even at such times when the said frames are not required at all, that is to say, when the baking-plates and the dough loaves thereon are in the oven. Another objection, in the case of such fixed frames when applied to baking-ovens having a number of tiers or decks, is this, that the baking plate or plates supported by the lower tier or tiers of such frame is or are in most cases not conveniently accessible for placing the dough loaves thereon or removing the baked loaves therefrom.

Our invention consists in the particular construction and combination of parts to be more fully hereinafter described, by means of which the above-mentioned objections are avoided.

Figure 4:
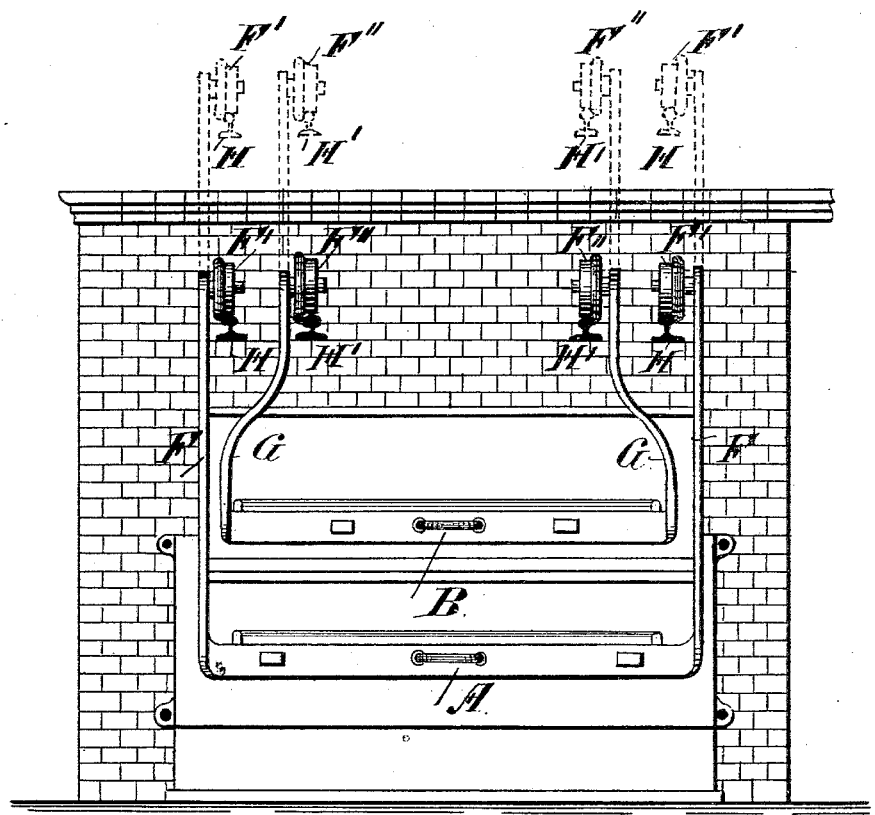

In the accompanying drawings, illustrating our invention as applied to a baking-oven having two tiers or decks, Figure 1 is a vertical longitudinal section, on the line $y\, y$ of Fig. 2, of a baking-oven of well-known construction. Fig. 2 is a vertical transverse section on the line $x\, x$ of Fig. 1. Fig. 3 is a corresponding front elevation. Fig. 4 is a front elevation showing a modification.

C designates the baking-oven, which may be of any well-known construction, the front portion of the oven only being here shown and the rear portion, containing the furnace, being omitted.

D D and E E are rails arranged within the baking-oven in the upper and lower tier or deck thereof, respectively.

A and B are movable frames arranged to slide by means of rollers or wheels E' E'', provided at or near their rear ends, upon the said rails D D and E E, respectively. The front end of each of the said movable frames A and B, according to the construction shown in Figs. 1, 2, and 3, is provided with downwardly-extending legs F F and G G, respectively, and adapted by means of rollers or wheels F' F' and F'' F''', suitably journaled in the lower ends of the said legs, to travel on rails H H and H' H', arranged on the floor immediately in front of the baking-oven. It will thus be seen that the said frames with their rear ends traveling on their rails D D and E E, respectively, within the baking-oven and their front ends traveling with their legs F and G, having the rollers or wheels F' and F'' on the rails H and H' in front of the oven, form movable carriages or frames which may be drawn out from and pushed back into the oven as far as convenient or desirable.

I I are the baking-plates, adapted to be placed on the said carriages and to slide on rollers provided thereon, as indicated by dotted lines in Fig. 1. If desired, the said baking-plates instead of being arranged to slide may also be rigidly secured to or form part of the said carriages or frames, although the former arrangement is preferable.

The legs F of the upper carriage or frame A are bent or curved outwardly, as shown in Fig. 3, so as to clear the sides of the lower carriage or frame as well as the baking-plate thereon and to enable each of the said carriages or frames to freely pass the other and thus to be drawn out from or pushed into the oven independently of the other. In Fig. 1 the upper carriage or frame, a portion of which is here shown as being broken away, is represented as being drawn out of the baking-oven, while the lower carriage or frame is still within the oven, all but the forward end, which will in every case remain outside of the baking-oven, suitable recesses or openings being left in the sliding doors in front of the oven, so that the said doors may be fully closed when the carriages or frames have been pushed home into the oven.

In the modified arrangement shown in Fig. 4 upwardly-extending arms or hangers G and F are provided at the front ends of the carriages or frames in lieu of the downwardly-projecting legs shown in Figs. 1 and 3. Journaled at the upper ends of the said arms or hangers are rollers F''' F''' and F' F', moving on suitable rails H' H' and H H, respectively. The said rails may either be attached to and extend directly from the oven front, as indicated by full lines in Fig. 4, or they may be suitably arranged above the oven, as indicated by dotted lines in the same figure. In the latter case the arms or hangers will of course be of correspondingly greater length. It will be seen that in this modification the forward ends of the carriages or frames hang suspended from the rails and travel thereon in a similar manner as in the arrangement illustrated in Figs. 1, 2, and 3. The arms or hangers G G of the upper carriage or frame are curved or bent inwardly at a short distance above the body of the frame proper and then again extend in a straight direction toward their respective rails. It will thus be seen that in this arrangement as well each of the carriages or frames will freely pass the other in being drawn out of or pushed into the oven.

The carriages or frames may in either of the constructional forms described be of such length as to fully or approximately correspond with the depth of the oven-chamber, as shown in Fig. 1, or where the floor-space or the space overhead is limited they may be shorter, as indicated in the same figure by dotted lines. In the latter case the baking-plates may be longer than the carriages or frames, so as to extend beyond or overhang the rear ends of the latter when within the oven, and upon these short carriages or frames being drawn out of the baking-oven the baking-plates may be drawn forward thereon, so as to extend beyond or overhang the forward ends of the said carriages or frames. The baking-plates will then be quite as conveniently accessible in their full length as if the said carriages or frames and the rails in front of the oven corresponded in length with the entire depth of the oven-chamber.

It will thus be seen that our improvement admits of a better utilization of the space in front of the oven than has been possible heretofore, inasmuch as large-size baking-plates even may be drawn out to their full length and even in such cases where the ground or overhead space in front of the oven is less than the full depth of the oven-chamber and inasmuch as each of the carriages or frames may be drawn out from or inserted into the oven independently from the other.

The invention is equally well applicable for baking-ovens having a number of baking-chambers arranged in tiers or decks, the one above the other, as well as for ovens having but one baking-chamber.

Another important advantage of our improvement is this, that the space in front of the oven is fully available for other purposes when the carriages or frames are within the oven.

We wish it understood that we do not confine our invention to the particular constructions shown and described, since it is obvious that these admit of a number of modifications within the scope of the invention. Thus instead of two rails for the forward end of each of the movable carriages or frames, as shown, a single rail might be used, each pair of legs or hangers being in that case joined at the ends and there provided with a single wheel or roller to travel on a single rail, and the rails for the upper and lower carriage or frame being arranged in different horizontal planes.

Having thus fully described our invention, what we desire to claim and secure by Letters Patent, is—

1. In a baking-oven having two or more oven-chambers arranged in as many tiers or decks, two or more carriages or frames, each adapted to carry a baking-plate and to be run forward and backward within an individual oven-chamber as described, means for guiding the rear end of each carriage or frame within its individual oven-chamber, downwardly-extending legs of different lengths at the forward ends of the said carriages or frames, the legs of each adjoining upper carriage or frame being curved out of the way of the next carriage or frame below, and means, such as rails, for guiding the said legs on the floor outside the baking-oven, substantially as and for the purpose set forth.

2. In a baking-oven having two or more oven-chambers arranged in as many tiers or decks, two or more carriages or frames, each adapted to carry a baking-plate and to be run forward and backward within an individual oven-chamber as described, means for guiding the rear end of each carriage or frame within its individual oven-chamber, arms or hangers of different lengths extending from the forward ends of the said carriages or frames, the arms or hangers of one or more carriages or frames being curved out of the way of the next carriage or frame above it, and means, such as rails, for guiding the said arms or hangers, substantially as and for the purpose set forth.

In testimony whereof we have signed our names to this specification in the presence of two subscribing witnesses.

Dated this 6th day of February, 1894.

HERMANN WERNER.
PAUL PFLEIDERER.

Witnesses as to Hermann Werner:
CARL SPIEGLER,
WILH. HEINRICH.

Witnesses as to Paul Pfleiderer:
ALFRED BIENZ,
G. RUBLER.